United States Patent [19]

Delzer et al.

[11] Patent Number: 5,130,288
[45] Date of Patent: Jul. 14, 1992

[54] COGELLED MIXTURES OF HYDRATED ZINC OXIDE AND HYDRATED SILICA SULFUR SORBENTS

[75] Inventors: Gary A. Delzer; Dennis R. Kidd, both of Bartlesville, Okla.

[73] Assignee: Phillips Petroleum Company, Bartlesville, Okla.

[21] Appl. No.: 665,831

[22] Filed: Mar. 7, 1991

[51] Int. Cl.$^5$ .......................... B01J 20/10; B01J 21/08; C01B 17/16

[52] U.S. Cl. ..................... 502/405; 423/239; 423/244; 502/234; 502/237; 502/253; 502/407; 502/408

[58] Field of Search ............... 502/407, 408, 400, 233, 502/234, 237, 253, 343, 405

[56] References Cited

U.S. PATENT DOCUMENTS

| | | | |
|---|---|---|---|
| 2,292,632 | 8/1942 | Greger | 502/407 |
| 2,551,905 | 5/1951 | Robinson | 23/2 |
| 3,506,732 | 4/1970 | Crowley et al. | 502/253 |
| 4,044,114 | 8/1977 | DeZael et al. | 423/574 |
| 4,088,736 | 5/1978 | Courty et al. | 423/230 |
| 4,533,529 | 5/1985 | Lee | 423/230 |
| 4,725,415 | 2/1988 | Kidd | 423/230 |
| 4,871,710 | 10/1989 | Denny et al. | 502/407 |
| 4,946,660 | 8/1990 | Denny et al. | 502/400 |
| 4,990,318 | 2/1991 | Kidd | 423/230 |

Primary Examiner—Paul E. Konopka
Attorney, Agent, or Firm—Charles W. Stewart

[57] ABSTRACT

The composition of this invention is a silicated zinc oxide that comprises a co-gelled mixture comprising zinc oxide and silica. This co-gelled mixture is used as a sorbent for removing sulfur compounds from sulfur containing fluids by contacting such fluids with the sorbent. The composition can be prepared by a silicating process wherein the compositon is manufactured by silicating zinc oxide to form a co-gelled mixture.

28 Claims, No Drawings

COGELLED MIXTURES OF HYDRATED ZINC OXIDE AND HYDRATED SILICA SULFUR SORBENTS

BACKGROUND OF THE INVENTION

This invention relates to the removal of sulfur compounds from fluid streams containing such compounds by contacting these fluid streams with a sorbent composition. Another aspect of this invention is that it relates to a method for the manufacture of sorbent compounds.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur-sensitive catalysts or to satisfy other process requirements.

Various sorption materials have been proposed as sorbents for the removal of sulfur compounds from fluid streams containing such compounds. Of these materials, many do not have the desirable properties necessary for being effective, commercially viable sorbing materials. In order for a sorbent composition to be commercially useable, it must have a high sulfur-sorption capacity and it must be capable of efficiently removing significant amounts of sulfur from sulfur contaminated fluid streams. It has been found that many of these sorbent compositions effectively oxidize certain quantities of hydrogen sulfide, when contacted with such compositions, to sulfur dioxide with the resulting sulfur dioxide thereafter passing through the contact material with the treated fluid stream. This phenomenon is sometimes called sulfur slippage. It is desirable to have a sorption material which not only has a high capacity to adsorb or absorb, or both, sulfur from a fluid stream, but also, minimizes the amount of sulfur slippage.

SUMMARY OF THE INVENTION

It is thus an objective of this invention to provide an improved process for the sorption of sulfur compounds from fluid streams containing such compounds.

A further object of this invention is to provide an improved composition for use as a sorbent of sulfur compounds.

A still further object of this invention is to provide a method for improving the sorption capacity of certain sulfur sorbents and a method of manufacturing such sorbents.

One of the compositions of this invention comprises a co-gelled mixture comprising hydrated zinc oxide and hydrated silica. This co-gelled mixture is suitable for use as a sorbent for removing sulfur compounds from sulfur containing fluids by contacting such fluids with the sorbent. The composition can be prepared by a silicating process wherein the composition is manufactured by silicating zinc oxide to form a co-gelled mixture comprising zinc oxide and silica.

Other aspects, objects and advantages of this invention will become apparent from a study of this disclosure and the appended claims.

DETAILED DESCRIPTION OF THE INVENTION

In accordance with one preferred embodiment of this invention, an improved sulfur sorbent composition comprising silicated zinc oxide has been found to provide significant, unexpected improvements in certain sorption characteristics over those compositions known in the art. As used herein, the terms "sorbent", "sorbent composition", "sorbent compounds", "sorbent material", "sorbent mixture", "sorption", "sorption process", "sorbed" and the like are utilized in a generic sense in referring to the mass transfer mechanisms and the mass transfer features described in this specification which can include, but are not limited to, absorption, chemi-absorption, adsorption and combination thereof. Because it is uncertain as to the precise physical or chemical, or both, mechanisms which occur when employing the inventive compositions and processes described herein, the above listed terms, or any terms in similar form, are used for the sake of convenience and are not intended to limit in any way the present invention. It has been discovered that the novel compositions described in this specification provides unexpected improvements in sulfur sorption capacity. Additionally, the use of the novel sorbents in a sorption process unexpectedly and significantly reduces the amount of sulfur slippage, as compared with using other known sulfur sorbents, that occurs when the novel sorbent composition is contacted with a sulfur contaminated fluid stream.

A preferred embodiment of the novel sorption composition of this invention comprises a co-gelled mixture comprising hydrated zinc oxide and hydrated silica. The zinc oxide used in the preparation of the co-gelled mixture can be in any form, or derived from any source, suitable for providing the active form of zinc oxide. Examples of zinc oxide compounds that are convertible into the active form of zinc oxide by the treatment with heat or oxygen, or both, include, but are not limited to, zinc sulfide, zinc sulfate, zinc hydroxide, zinc carbonate, zinc acetate, and zinc nitrate.

A hydrate of zinc oxide is prepared by making, using any suitable method known in the art, a slurry of zinc oxide followed by the addition of a dilute acid. The slurry or liquid suspension is made by intimately mixing water, or any other suitable solvent, with the zinc oxide material that is reduced in size to form a suitably sized fine powder.

A small quantity of acid is added to the mixture of solvent and zinc oxide powder to acidify and to help form a hydrated zinc oxide or an acidified slurry of zinc oxide. Generally, however, after the addition of the acid, the acidified mixture is stirred, without the input of heat energy, for a time period upwardly to about 60 minutes and, preferably, the acidified mixture is stirred for a period of 5 minutes to 15 minutes.

The acid used to acidify the mixture of solvent and zinc oxide can be any suitable acid that will give the desired slurry properties. It is preferred, however, that an acid be selected from the group consisting of nitric acid, sulfuric acid, hydrochloric acid, acetic acid and mixtures thereof, for use as an acidifying agent. The most preferred acid for use as an acidifying agent is nitric acid. The amount of acid employed in acidifying the mixture of solvent and zinc oxide can be any suitable amount necessary to form the hydrated zinc oxide slurry having a pH of from about 1.0 to about 3.0. Most preferably, the pH of the slurry will range from about 1.5 to about 2.0

The hydrated silica used in the preparation of the co-gelled mixture can be in any form suitable for co-precipitation with hydrated zinc oxide. An embodiment of this invention includes the preparation of the hydrated silica by making a dilute aqueous solution of sodium silicate. The dilute aqueous mixture of sodium silicate is rapidly acidified with any suitable acid that will cause a solution, not a gel, to be formed. It is preferred that an acid be selected from the group consisting of nitric acid, sulfuric acid, hydrochloric acid, acetic acid and mixtures thereof for use as the acidifying agent. The most preferred acid, however, is nitric acid. The amount of acid employed in acidifying the aqueous mixture of sodium silicate can be any suitable amount necessary to form a solution having a pH in the range of from about 1.0 to about 3.0. Most preferably, the amount of acid will give a pH of from 1.5 to 2.0.

The co-gelled mixture comprises any suitable mixture of hydrated zinc oxide and hydrated silica that will provide the desired sorption properties of high sulfur sorption capacity and low sulfur slippage when contacted with a sulfur contaminated fluid stream. Generally, the zinc oxide form, whether it is in the form of a hydrated zinc oxide, zinc oxide, or some complex molecule containing zinc oxide, will be present in the co-gelled mixture in an amount in the range of upwardly to about 95 parts by weight per 100 parts by weight of the total weight of the co-gelled mixture. Preferably, the zinc oxide form, can be present in an amount in the range of from about 70 to 90 parts by weight per 100 parts by weight of the total weight of the co-gelled mixture. Most preferably, the zinc oxide form is present in an amount in the range of from about 75 to about 85 parts by weight per 100 parts by weight of the total weight of the co-gelled mixture.

As for the hydrated silica portion of the co-gelled mixture, any suitable amount that will provide the desired sorption properties of high sulfur sorption capacity and low sulfur slippage when contacted with a sulfur contaminated fluid stream can be used. Generally, the final silica form will be present in the co-gelled mixture in an amount in the range upwardly to about 40 parts by weight per 100 parts by weight of the total weight of the co-gelled mixture. Preferably, the silica form will be present in the amount in the range of from about 10 to about 30 parts by weight per 100 parts by weight of the co-gelled mixture.

To produce the final co-gelled mixture, or composition, the acidified slurry of zinc oxide and the acidified aqueous mixture of sodium silicate are intimately mixed, or blended, immediately after preparing the acidified sodium silicate solution, by any suitable method for any suitable period of time necessary to properly homogenize the slurry and the solution. Generally, however, the blending time is usually less than about 60 minutes. Preferably, the blending time will be in the range of from about 2 minutes to about 30 minutes.

Once the slurry and the solution are properly homogenized, a suitable base compound is added to the blended mixture to produce the precipitate or co-gelled mixture comprising hydrated zinc oxide and hydrated silica, or comprising zinc oxide and silica, or comprising a mixture of hydrated zinc oxide, zinc oxide, hydrated silica and silica. Examples of such suitable base compounds include, but are not limited to, alkali metal hydroxides, ammonium hydroxide and urea. Ammonium hydroxide is the preferred base compound. Following the addition of a suitable base compound to the blended mixture of slurry and solution, the resultant co-gelled mixture can optionally be washed to remove sodium and other contaminants, dried to remove water and further processed to produce an agglomorate or aggregate material for use in contacting with a sulfur contaminated fluid stream. The co-gelled mixture produced in this way yields a material of unique pore size distribution, pore volume, and surface area as compared with simple mixtures of zinc oxide and silica.

The washing of the co-gelled mixture can be performed with any suitable solvent which will remove the sodium and other contaminants from the mixture. Generally, this washing step will utilize water as a solvent wherein appropriate quantities of ammonium nitrate can optionally be added to facilitate the removal of sodium from the co-gelled mixture. The co-gelled mixture can be washed with a solvent any number of times necessary for the removal of undesirable contaminants. A preferred approach to washing the co-gelled mixture is to first perform a washing step using a water and ammonium nitrate solution followed by at least one washing step using water alone.

The washed co-gelled mixture can be dispersed in water to form an aqueous slurry by any suitable method for producing slurries followed by spray drying. Any suitable spray drying method or spray drying apparatus can be used to produce a product having the desired physical properties. Examples of such suitable spray drying methods and apparatuses are listed and described in *Perry's Chemical Engineers' Handbook, Sixth Edition*, Edited by D. W. Green (McGraw-Hill, 1984) at pp. 20–54 through 20–58. The various physical properties of interest include, but are not limited to, particle size, bulk density and dustiness.

Following the mixing of the spray dried material and dilute acid solution, the paste material formed undergoes an agglomeration step. The agglomeration step is utilized to enlarge the size of the sorbent material particles and to form them into relatively permanent masses having certain desirable forms such as spheroids, pills or tablets, cylinders, irregular extrusions or merely loosely bound aggregates or clusters. Any suitable method of agglomeration known in the art can be used. Examples of such methods include, but are not limited to, molding, tabletting, pressing, pelletizing, extruding, and tumbling. The preferred method, however, is by extrusion. Various types of extrusion methods and extrusion equipment can be used. It is preferred to use either a single-screw extruder or a double-screw extruder which uses a screw or auger to convey or force the paste through a die plate to produce the desirable shapes or extrusion profiles.

The spray dried material, having the desired physical properties, is mixed with a dilute acid solution to form a paste or paste like material with properties favorable for extruding. The mixing of the spray dried material and dilute acid solution can be performed in a batchwise fashion or a continuous fashion provided that the components are thoroughly and intimately mixed prior to further processing. Suitable types of batch mixers include, but are not limited to, change-can mixers, stationary-tank mixers, double-arm kneading mixers having any suitable type of agitator blades such as sigma blades, dispersion blades, multiwiping overlap blades, single curve blades, double-naben blades, and the like. Suitable types of continuous mixers can include, but are not limited to, trough-and-screw mixers and pug mills. To achieve the desired dispersion of the spray dried material, the material is mixed until a homogenous paste is formed. The mixing time should be sufficient to give a uniform paste or paste like mixture and, generally, will be less than about 45 minutes. Preferably, the mixing time will be in the range of from about 2 minutes to about 15 minutes.

After the paste is extruded, the extruded material is then dried, preferably at a temperature generally in the range of from about 75° C. to about 300° C., and more preferably in the range of from about 90° C. to about 250° C., for a period of time generally in the range of from about 0.5 hour to about 4 hours and, more preferably, in the range of from about 1 hour to about 3 hours. The dried, extruded material is then calcined in the presence of oxygen at a temperature suitable for achieving the desired degree of calcination, for example, generally in the range of from about 375° C. to about 750° C. and, more preferably, in the range of from about 500° C. to about 700° C. The calcination step is conducted for a period of time suitable for achieving the desired degree of calcination, for example, generally in the range of from about 0.5 hour to about 4 hours and, more preferably, in the range of from about 1 hour to about 3 hours to produce a final composition.

The resultant sorbent composition prepared by the above-described process or method for silicating zinc oxide or a material convertible into an active form of zinc oxide can be described as a silicated zinc oxide. This silicated zinc oxide can comprise a co-gelled mixture comprising hydrated zinc oxide and hydrated silica, or zinc oxide and silica, or a mixture of hydrated zinc oxide, zinc oxide, hydrated silica, and silica that can be further processed by calcination of the co-gelled mixture at suitable calcination temperatures and for suitable time periods as previously described.

The novel sorbent composition can be used in a sorption process for removing sulfur compounds from fluid streams. The sorption process is preferably carried out in cycles comprising a sorption period and a period for the regeneration of the sulfided sorbent. The sorption process comprises contacting a gaseous stream which contains hydrogen sulfide with the sorbent to thereby remove hydrogen sulfide from the gaseous stream. The sorbent becomes sulfided during the sorption period. When the sorbent becomes sulfided to the point that regeneration is desirable, preferably when it is nearly completely sulfided, an oxygen-containing gas is passed in contact with the sorbent to regenerate the sorbent material and to convert the sorbed sulfur to a sulfur oxide.

The chemical changes that are believed to occur in the sorbent during this cyclic process are summarized in the following equations:

$$ZnO + H_2S \longrightarrow ZnS + H_2O \tag{I}$$

$$ZnS + \text{Oxygen} \longrightarrow ZnO + SO_x \tag{II}$$

The sorbent of the present invention can be utilized to remove hydrogen sulfide from any suitable gaseous stream. The hydrogen sulfide may, for example, be produced by the hydrodesulfurization of organic sulfur compounds or may be originally present in the gaseous stream as hydrogen sulfide. Examples of such suitable gaseous streams include hydrogen sulfide-contaminated light hydrocarbons such as methane, ethane and natural gas; gases derived from petroleum products and products from extraction and/or liquefaction of coal and lignite; gases derived from tar sands and shale oil; coal-derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The sorbent of the present invention can also be utilized to remove hydrogen sulfide from hydrogen sulfide-contaminated olefins such as ethylene. This process, however, should be carried out in the absence of free hydrogen to avoid hydrogenation of the olefins.

The sulfur removal processes of the present invention can be carried out by means of any apparatus whereby there is achieved an alternate contact of the sorbent with the sulfur-containing gaseous feed stream and, thereafter, of the sorbent with an oxygen-containing gas which is utilized to regenerate the sorbent. The sulfur removal process is in no way limited to the use of a particular apparatus. The sulfur removal process of this invention can be carried out using a fixed bed of sorbent, a fluidized bed of sorbent, or a moving bed of sorbent. Presently preferred is a fixed bed of sorbent.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized, but the purge should be continued until all hydrocarbon or hydrogen sulfide, or both, is removed. Any suitable flow rate of the purge fluid can be utilized. A presently preferred purge fluid flow rate is one which will give a gaseous hourly space velocity (GHSV) in the range of from about 800 GHSV to about 1200 GHSV. As used herein, the term "gaseous hourly space velocity" is defined as the ratio of the gaseous volumetric flow rate at standard conditions of 60° F. and one atmosphere of pressure to the reactor volume.

Any suitable temperature for the sulfur-removal processes of the present invention can be utilized which will achieve the desired removal of sulfur from a gaseous feed stream. The temperature will generally be in the range of from about 150° C. to about 600° C. and will more preferably be in the range of from about 200° C. to about 450° C.

Any suitable temperature can be utilized which will regenerate the sorbent from its sulfided form back to the original sorbent form. The regeneration temperature will generally be in the range of from about 370° C. to about 815° C. The regeneration temperature is preferably in the range of from about 425° C. to about 750° C. Most preferably, the regeneration temperature should range from about 425° C. to about 600° C.

Any suitable pressure can be utilized for the processes of the present invention. The pressure of the gaseous feed stream being treated is not believed to have an important effect on the sorption process of the present invention, and will generally be in the range of from about atmospheric to about 2,000 psig during the treatment.

When the sorbent is completely sulfided, it will no longer combine with the hydrogen sulfide in the manner set forth in equation (I) hereinabove. When this condition occurs, hydrogen sulfide will begin to appear in the effluent flowing from the reaction and this will be an indication that the sorbent should preferably be regenerated. The time required for the sorbent to become completely sulfided will generally be a function of the concentration of sulfur in the feedstock, feed rate employed and the sorption capacity of the sorbent.

When the sorbent becomes substantially completely sulfided, the sorbent is typically regenerated by terminating the flow of feed to the reactor and purging with an inert fluid such as nitrogen to remove any combustible compounds. A free oxygen-containing gas is then introduced to the reactor for the purpose of oxidizing the zinc sulfide in accordance with Equation (II) hereinabove. The amount of oxygen supplied to the reactor during the regeneration step will generally be that which is sufficient to at least substantially remove sulfur from the sorbent. The regeneration step is generally conducted at about atmospheric pressure.

The following examples are presented in further illustration of the invention.

EXAMPLE I

This example illustrates the method of preparation of the novel compositions which are employed in the process of Example II.

The silicated zinc oxide composition was prepared by mixing an acidified slurry of zinc oxide and an acidified solution of sodium silicate followed by the addition of aqueous ammonia to gel the mixture. The acidified slurry of zinc oxide was prepared by first mixing 162.7 grams of zinc oxide powder with 2.0 liters of water to form an aqueous slurry of zinc oxide. The zinc oxide used in this preparation was obtained from St. Joe Minerals Corporation of Palmerton, Pennsylvania. Following the formation of the zinc oxide slurry, the slurry was acidified by adding 10 millimeters of nitric acid and thoroughly stirring the thus formed mixture for a period of about 10 minutes to give an acidified slurry of zinc oxide. The acidified solution of sodium silicate was prepared first by dissolving 140.3 grams of sodium silicate solution in 420.9 grams of water to form a solution of sodium silicate. To this sodium silicate solution, 150 millimeters of nitric acid was rapidly added, while the sodium silicate solution was simultaneously being stirred, to form an acidified sodium silicate solution. Immediately, the acidified sodium silicate solution was thoroughly mixed with the acidified zinc oxide slurry for a time period of 10 minutes followed by the addition of 300 milliliters of aqueous ammonia to form a co-gelled mixture of hydrated zinc oxide and hydrated silica. The formed solid was separated from the liquid by filtration and washed four times each of which using two liters of water. In the first of the four washing steps, 60 grams of ammonium nitrate was dissolved in 2 liters of water to help facilitate the removal of sodium. After the fourth washing step, the material was slurried in one liter of water and spray dried using a Yamato laboratory spray drier wherein the operating conditions were as follows:
inlet temperature=210° C.
outlet temperature=90° C.
atomizing air pressure=17 psig
drying air flow rate=8 to 8.5 cubic meters per minute
aspirator setting=7
pump setting=3 to 3.5

A 98.9 grams portion of the spray dried material was mulled in 93.61 grams of nitric acid solution, comprising 118.44 parts by weight water and 1.48 parts by weight concentrated nitric acid, to form a paste or paste like material suitable for extrusion. The paste was extruded followed by drying in air for a period of about 24 hours. The air dried material was then oven dried at a temperature of 110° C. for a three hour period, followed by calcination at a temperature of 500° C. for a period of three hours. The final silicated zinc oxide material comprised approximately 80 weight percent zinc oxide and 20 weight percent silica ($SiO_2$) with "weight percent" defined as the weight ratio of the particular component as a fraction of the total combined weight of the zinc oxide and the silica multiplied by a factor of one-hundred.

A nickel promoted silicated zinc oxide composition was prepared by impregnating a portion of the extrudate prepared as described hereinabove with a nickel nitrate solution. To impregnate the extrudate, 11 grams of said extrudate was impregnated with a nickel nitrate solution comprising 3.55 grams of nickel nitrate hexahydrate dissolved in 4.5 grams of water. After impregnation, the material was dried at a temperature of 120° C. for a 3 hour period followed by calcination at 450° C. for a 3 hour period. This procedure gave a composition comprising approximately 6 parts by weight nickel, 80 parts by weight zinc oxide, and 20 parts by weight silica.

A comparative composition comprising a mixture of zinc oxide and silica was prepared as follows. 80 grams of zinc oxide was mixed with 20 grams of silica. The silica used in the composition was obtained from Cabot Corporation of Tuscola, Ill. sold under its tradename Cab-o-sil. The combined zinc oxide and silica were dry mixed for about 3 minutes prior to mulling in 65.92 grams of a solution, comprising 118.44 parts by weight water and 1.48 parts by weight concentrated nitric acid, to form a paste having the desired consistency. The paste was extruded and subsequently air dried overnight followed by an additional drying step at 110° C. for a period of 3 hours. The dried extrudate was then calcined at about 500° C. for about 3 hours. A 25 gram portion of the extrudate was impregnated with a solution containing 7.43 grams of nickel nitrate hexahydrate dissolved in 9.29 grams of water. After impregnation, the impregnated extrudate was dried under a heat lamp for about 1 hour, then dried at about 120° C. for about 3 hours, and finally calcined at 500° C. for 3 hours to form the comparative composition.

EXAMPLE II

The process of this invention was carried out using the absorbing compositions produced in Example I.

A reactor was filled with a 5 cc volume bottom layer of inert quartz chips on top of which was placed a 10 gram layer of the particular sorbent. The reactor, which was maintained at a pressure of about 1.7 psig, was operated in a fixed bed, downflow mode. Within the reactor, the sorbent was heated to the desired operating temperature by an electric furnace. During the heating process, the sorbent was maintained under a nitrogen flow. When the desired temperature of about 425° C. to 455° C. was attained, the nitrogen flow was stopped, and a simulated sulfur plant gas and, when used, water vapor flows were started. The water vapor was generated by pumping water through a heated line that was connected to the top of the reactor. The reaction was carried out at a reaction temperature in the range of from about 425° C. to 455° C. and a gaseous hourly space velocity (GHSV) of 2500 cc/cc absorbent/hour. The composition of the simulated sulfur plant gas was as follows: 1.4 volume percent hydrogen sulfide, 13.3 volume percent carbon dioxide, and 85.3 volume percent nitrogen or 1.4 volume percent hydrogen sulfide and 98.6 volume percent nitrogen.

The sorbent was used in a cyclic manner. A complete process cycle consists of a contacting step whereby an $H_2S$ containing stream is brought into contact with the sorbent and in which $H_2S$ is removed from the fluid stream and a regeneration step. Once the sorbent becomes spent, as can sometimes be evidenced by increases in the amount of $H_2S$ that breaks through the bed of sorbent, the fluid stream being treated is discontinued and the sorbent is regenerated by passing a gas containing free oxygen in contact with the sorbent. The oxygen contained in the regeneration gas serves to convert the removed sulfur to an oxide compound, and to drive from the sorbent material the removed sulfur in the form of SOx.

The progress of the sorption process was followed by measuring the concentration of hydrogen sulfide in the reactor effluent after the water vapor had been condensed and removed from the effluent. The concentration of hydrogen sulfide or sulfur dioxide, or both, was measured with commercially available Draeger tubes that were suited to the concentration ranges encountered and in accordance with the manufacturer's recommendation.

Once the sorbent became fully sulfided, as evidenced by hydrogen sulfide breakthrough, the flow of the simulated sulfur plant gas to the reactor was halted and the reactor was purged with nitrogen for a period of 20 minutes while being heated to a regeneration temperature of about 1170° F. The sulfided sorbent was then regenerated in the presence of air for about 1.5 hours. Following regeneration, the reactor was again purged with nitrogen for 40 minutes while being cooled back down to the reaction temperature in the range of about 800° F. to about 850° F. The nitrogen purge was then halted and the simulated sulfur plant gas was fed to the reactor to begin another sorption cycle.

This example illustrates the use of the sorbent prepared in the manner described in Example I for the removal of $H_2S$ from a simulated sulfur plant gas stream. The results are presented as a function of the amount of sulfur dioxide present in the treated effluent gaseous stream (measured in ppm) at the time of the reading. The sulfur loading is the weight percent of sulfur present on the sorbent at the time when hydrogen sulfide breaks through the sorbent bed. This is essentially the sorption capacity of the sorbent material. The test results are summarized in Table I.

TABLE I

| cycle | silicated ZnO (invention) | | ZnO plus silica (comparative composition) | |
|---|---|---|---|---|
| | $SO_2$ (ppm) | sulfur loading (weight %) | $SO_2$ (ppm) | sulfur loading (weight %) |
| 1 | 32 | 18.6 | 0 | 14.4 |
| 6 | 700 | 18.2 | | |
| 8 | | | 1300 | 13.5 |
| 10 | 680 | 17.0 | | |
| 15 | | | 1300 | 11.0 |
| 29 | 650 | 8.5 | | |
| 37 | 555 | 8.5 | | |

TABLE I-continued

| cycle | silicated ZnO (invention) | | ZnO plus silica (comparative composition) | |
|---|---|---|---|---|
| | $SO_2$ (ppm) | sulfur loading (weight %) | $SO_2$ (ppm) | sulfur loading (weight %) |
| 44 | 580 | 7.9 | 3600* | <2.2 |

*The $SO_2$ detector tubes used will react with $H_2S$. Therefore the 3600 ppm reading could indicate an $H_2S$ breakthrough at 10 minutes rather than 17 minutes, which was the time of the first $H_2S$ reading. At 17 minutes, the $H_2S$ concentration was off scale on the 150 ppm detector tube used.

The data present in Table I show the improvement in sulfur removal performance that will result from utilizing the novel compositions as herein described. Table I shows that the novel sorbent mixtures significantly and materially reduce the amount of sulfur slippage, which is the amount of hydrogen sulfide that is oxidized to sulfur dioxide during the adsorption cycle, over that of the comparative composition. Furthermore, a comparison of the sulfur loadings set forth in Table I shows that the inventive compositions employed in the process of the present invention have a dramatically improved sulfur loading capacity. The data presented in Table I clearly establishes the improvements over the prior art that are achievable using the novel composition in the inventive process.

Reasonable variation and modifications are possible within the scope of this disclosure without departing from the scope and spirit thereof.

That which is claimed is:

1. A sorbent composition comprising: a co-gelled mixture comprising hydrated zinc oxide and hydrated silica.

2. A composition as recited in claim 1 wherein said co-gelled mixture is prepared by mixing said hydrated zinc oxide and said hydrated silica followed by adding to thus formed mixture a suitable base.

3. A composition as recited in claim 1 wherein:
   the hydrated silica is present in said co-gelled mixture ranging upwardly to about 60 parts by weight per 100 parts by weight of the total combined weight of said co-gelled mixture.

4. A composition as recited in claim 3 wherein said co-gelled mixture is prepared by mixing said hydrated zinc oxide and said hydrated silica followed by adding to thus formed mixture a suitable base.

5. A composition as recited in claim 3 wherein said co-gelled mixture is calcined.

6. A composition as recited in claim 5 wherein said co-gelled mixture is prepared by mixing said hydrated zinc oxide and said hydrated silica followed by adding to thus formed mixture a suitable base.

7. A composition as recited in claim 1 wherein:
   said hydrated zinc oxide is contained in the form of an acidified slurry of zinc oxide and said hydrated silica is contained in the form of an acidified solution of sodium silicate.

8. A composition as recited in claim 7 wherein said co-gelled mixture is prepared by mixing said hydrated zinc oxide and said hydrated silica followed by adding to the thus formed mixture a suitable base.

9. A method of improving the sorbent capacity of a sorbent composition comprising the step of:
   silicating zinc oxide to form a co-gelled mixture comprising zinc oxide and silica.

10. A method as recited in claim 9 wherein:

said silicating step comprises mixing an acidified slurry of zinc oxide with an acidified solution of sodium silicate and adding to the thus formed mixture a base suitable for causing the formation of said co-gelled mixture.

11. A method of manufacturing a sorbent composition, comprising the steps of:

mixing an acidified slurry of zinc oxide with an acidified solution of sodium silicate; and adding a base, suitable for causing the formation of a co-gelled mixture comprising zinc oxide and silica, to the thus formed mixture.

12. A method as recited in claim 11 wherein:

said base is selected from the group consisting of alkali metal hydroxides, ammonium hydroxide, and urea.

13. A method of manufacturing a sorbent composition, comprising the steps of:

mixing a slurry of zinc oxide treated with a first acid suitable for acidifying said slurry of zinc oxide and an aqueous solution of sodium silicate treated with a second acid suitable for acidifying said aqueous solution of sodium silicate to form a mixture; and adding to said mixture a base suitable for causing the formation of a co-gelled mixture comprising zinc oxide and silica.

14. A method as recited in claim 13 wherein:

said base is selected from the group consisting of alkali metal hydroxides, ammonium hydroxide, and urea.

15. A method as recited in claim 13 wherein:

said first acid or said second acid is an acid selected from the group consisting of nitric acid, sulfuric acid, hydrochloric acid, acetic acid and mixtures thereof.

16. A method as recited in claim 15 wherein:

said base is selected from the group consisting of alkali metal hydroxides, ammonium hydroxide, and urea.

17. A method as recited in claim 13 wherein:

said first acid or said second acid is nitric acid.

18. A method as recited in claim 17 wherein:

said base is selected from the group consisting of alkali metal hydroxides, ammonium hydroxide, and urea.

19. A composition prepared by the method of claim 9.

20. A composition prepared by the method of claim 10.

21. A composition prepared by the method of claim 11.

22. A composition prepared by the method of claim 12.

23. A composition prepared by the method of claim 13.

24. A composition prepared by the method of claim 14.

25. A composition prepared by the method of claim 15.

26. A composition prepared by the method of claim 16.

27. A composition prepared by the method of claim 17.

28. A composition prepared by the method of claim 18.

* * * * *